United States Patent [19]

Endo et al.

[11] 4,340,931
[45] Jul. 20, 1982

[54] POWER SUPPLY SYSTEM

[75] Inventors: Tsunehiro Endo, Hitachiota; Humio Tazima, Ibaraki, both of Japan

[73] Assignee: Hitachi, Ltd., Tokyo, Japan

[21] Appl. No.: 211,289

[22] Filed: Nov. 28, 1980

[30] Foreign Application Priority Data

Nov. 30, 1979 [JP] Japan .................................. 54-155511
Feb. 5, 1980 [JP] Japan .................................. 55-12061

[51] Int. Cl.³ ............................................. H02M 1/14
[52] U.S. Cl. ...................................... 363/44; 363/124; 363/126
[58] Field of Search ....................... 363/34, 37, 44–48, 363/124, 126; 323/205, 207–211

[56] References Cited

U.S. PATENT DOCUMENTS

| | | |
|---|---|---|
| 3,913,002 | 10/1975 | Steigerwald et al. ............... 363/124 |
| 3,986,100 | 10/1976 | Beierholm et al. .................... 363/37 |
| 4,074,344 | 2/1978 | Pitel ....................................... 363/44 |
| 4,193,111 | 3/1980 | Wester ................................ 363/126 |

FOREIGN PATENT DOCUMENTS 2623200 12/1977 Fed. Rep. of Germany ...... 363/126
53-17931 2/1978 Japan .

Primary Examiner—William M. Shoop
Assistant Examiner—Peter S. Wong
Attorney, Agent, or Firm—Craig and Antonelli

[57] ABSTRACT

A power factor improving system for a power supply system, comprising an AC power supply, a rectifier circuit connected to the AC power supply, a smoothing circuit for smoothing the output current of the rectifier circuit and supplying DC power to the load, an inductance element inserted in series between the power supply and the rectifier circuit, switching means including a switching element and a rectifier element inserted between the AC input terminal of the rectifier circuit and one of the DC output lines thereof, and a control circuit for subjecting the switching element of the switching means to on-off control at a frequency higher than the frequency of the AC power supply.

8 Claims, 7 Drawing Figures

POWER SUPPLY SYSTEM

BACKGROUND OF THE INVENTION

The present invention relates to a power supply system or more in particular to a power factor improving system of a power supply system for rectifying and smoothing AC power from an AC power supply and applying DC power to a load.

In conventional systems for rectifying and smoothing an AC power supply and applying DC power to a load, an input current flows into a smoothing circuit in pulse form from the AC power supply. This has disadvantages of a lower power factor of the power supply and a large effective value of the input current.

A system has been previously suggested in which in order to improve the power factor of a power supply a reactor is inserted in series between an AC power supply and a rectifier circuit, a switching circuit is connected in parallel with the rectifier circuit as the input side thereof. In this arrangement, the switching circuit is operated only during the time when the input current is not applied to the rectifying circuit thereby to store the energy in the reactor intermittently. Thus, the energy stored in the reactor is discharged via the rectifier circuit to a capacitor making up a smoothing circuit so that the input current is applied intermittently thereby to improve the distortion of the current waveform with respect to the voltage waveform, thus improving the power factor of the power supply. (Japanese Patent Laid-Open Application No. 17931/78).

In this conventional system comprising a power factor improving circuit connected in parallel to the input terminal of the rectifier circuit and a switching element including a transistor for intermittently shorting the rectifier circuit, however, the current in the same direction is supplied to the transistor of the power factor improving circuit, thus requiring at least four diodes as in the rectifier circuit. Further, the control circuit for supplying a drive signal for driving the transistor must be isolated from the power circuit by some means.

Furthermore, in a system wherein an AC motor is driven through an inverter as a load, for instance, the AC current is required to be detected to actuate the power factor improving circuit effectively in accordance with the output condition of the inverter, and this AC current detector element must also be insulated by some means.

What is more, in view of the fact that the time TA of the switching operation and the duty cycle DC of the switching element are normally set to attain the maximum power factor Pf at the rated state of the load and are constant regardless of the load condition, the power factor Pf is very low depending on the magnitude of the load especially under a low load.

SUMMARY OF THE INVENTION

Accordingly, it is an object of the present invention to provide a power factor improving system for preventing the reduction in the power factor of the power supply by the smoothing circuit of the power supply system in which the AC power from the AC power supply is rectified and smoothed for conversion into direct current which is supplied to a load, thus obviating the shortcoming of the above-mentioned conventional systems.

Another object of the present invention is to provide a power factor improving system with fewer component elements in which the rectifier element for supplying the DC current to the switching element also functions as part of the rectifier elements of the rectifier circuit, thus simplifying the general configuration for an improved productivity.

Still another object of the present invention is to provide a power factor improving system in which the control circuit of the power factor improving circuit and the control circuit of the inverter making up the load are set at a common potential, so that these control circuits are integrated with each other thereby to eliminate the need of the insulating means.

A further object of the present invention is to provide a power factor improving system in which the time TA of the switching operation and the duty cycle Dc of the switching element are controlled in accordance with the change in the load conditions, thus maximizing the effect of the power factor improvement over a wide range of load conditions.

According to the present invention, there is provided a power factor improving system for a power supply system, comprising an AC power supply, a rectifier circuit connected to the AC power supply, a smoothing circuit for smoothing the output voltage of the rectifier circuit and supplying DC power to the load, an inductance element inserted in series between the power supply and the rectifier circuit, switching means including a switching element and a rectifier element inserted between the AC input terminal of the rectifier circuit and one of the DC output lines thereof, and a control circuit for subjecting the switching element of the switching means to on-off control at a frequency higher than the frequency of the AC power supply.

DESCRIPTION OF THE PREFERRED EMBODIMENTS

A system according to the present invention will be described with reference to the attached drawings.

Figure 1:
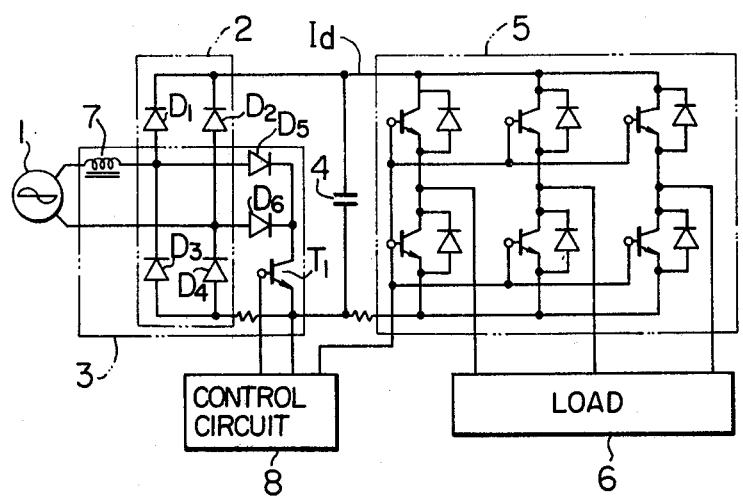
FIG. 1 is a fundamental circuit diagram showing a power supply system according to an embodiment of the present invention.

A fundamental circuit diagram of a power supply system according to the present invention is shown in FIG. 1. In the drawing, an AC power supply 1 is connected with a rectifier circuit 2 and a power factor improving circuit 3, so that the DC output produced from the rectifier circuit 2 is smoothed by a capacitor 4 making up a smoothing circuit and then applied to an inverter circuit 5.

The output terminal of the inverter 5 is connected to a load 6 such as an AC motor for supplying AC power to the load 6.

The power factor improving circuit 3 includes a rectifier circuit comprised of diodes $D_3$ to $D_6$ of which a set of diodes $D_3$ and $D_4$ are used in common by the rectifier circuit 2, a transistor $T_1$ making up a switching element inserted between the cathodes of the diodes $D_5$, $D_6$ and the anodes of the diodes $D_3$, $D_4$, and a reactor 7 making up an inductance element connected in series between the AC power supply 1 and the input terminal of the rectifier circuit 2.

Figure 2:
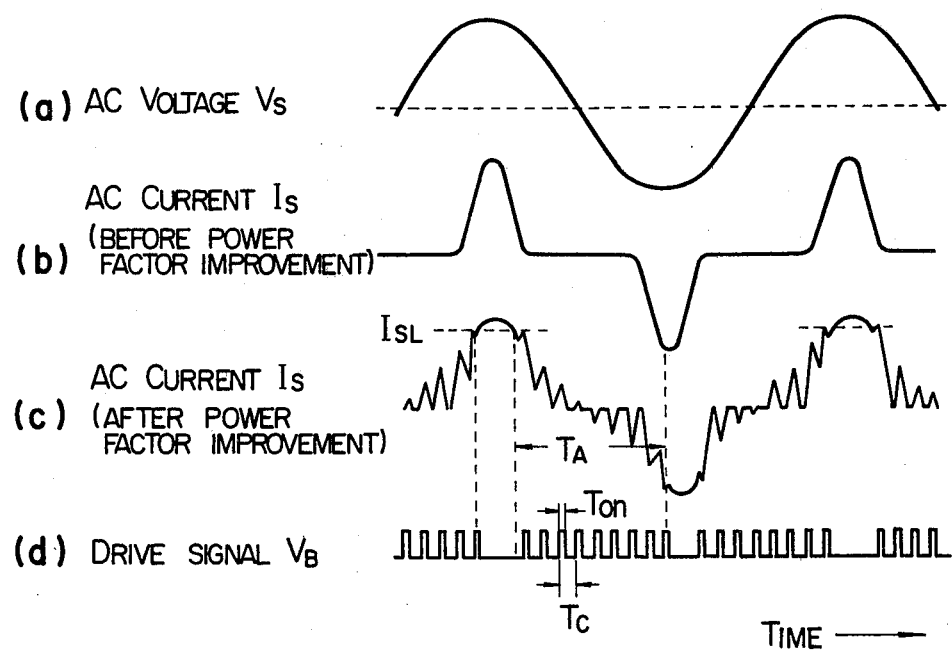
FIG. 2 shows waveforms for explaining the fundamental operation of the circuit of FIG. 1.

The operation of this power factor improving circuit 3 will be described with reference to FIG. 2. FIG. 2(a) shows a waveform of the AC voltage Vs of the AC power supply 1. The AC current Is corresponding to the AC voltage Vs takes a form flowing only at the central value of the rest value of the AC voltage Vs in the absence of the power factor improving circuit 3 as shown in FIG. 2(b).

This is by reason of the fact that the DC output of the rectifier circuit 2 is smoothed by the capacitor 4. Assuming that the AC voltage has no distortion, the power factor Pf of the power supply of this circuit is not very much affected by the phase difference between the current and voltage of the fundamental wave components but mainly by the distortion factor of the input current.

As seen from the above, the AC input current Is in the absence of the power factor improving circuit 3 has a pulse form and contains a number of high harmonics, so that the power factor Pf of the circuit as viewed from the power supply is generally about 60%.

By addition of the power factor improving circuit as shown in FIG. 1, the AC input current Is flows also in a period during which it otherwise would not flow as shown in FIG. 2(c), thus reducing the high harmonics for an improved power factor Pf.

Specifically, the transistor $T_1$ of the power factor improving circuit 3 is subjected to on-off control by the control circuit 8 of FIG. 1 in response to the drive signal $V_B$ as shown in FIG. 2(d). The power supply 1 is shorted by the reactor 7, the diodes $D_5$, $D_4$ (or $D_6$, $D_3$) and the transistor $T_1$, so that the current increases during the on state of the transistor $T_1$. When the transistor $T_1$ is turned off subsequently, the energy stored in the reactor 7 during the on time of the transistor $T_1$ causes the current Is to continue flowing, though decreasingly, into the capacitor 4 through the rectifier circuit 2. This operation is sequentially repeated thereby to obtain the current Is similar to the change in the voltage Vs.

In this power supply circuit, the power factor improvement at the power factor improving circuit 3 is affected mainly by two deciding factors.

One factor is the duty cycle Dc, namely, the ratio of the on time Ton of the transistor $T_1$ to the switching period Tc thereof ($=Ton/Tc \times 100$) shown in FIG. 2(d), and the other factor is the time $T_A$ of the switching operation of the transistor $T_1$ in a cycle of the AC voltage Vs (hereinafter referred to as the chopper operation time).

In the system of FIG. 1, the chopper operation time $T_A$ is determined by turning off the transistor $T_1$ when the AC current Is of FIG. 2(c) exceeds a predetermined current limit $I_{SL}$.

It has also been found that there is an optimum value of the chopper operation time $T_A$ and the duty cycle Dc for maximizing the power factor Pf depending on the magnitude of the load, namely, the magnitude of the DC current Id of FIG. 1.

In view of the fact that there is an optimum value of the duty cycle Dc and the chopper operation time $T_A$ according to the magnitude of the load, the method of controlling the chopper operation time and the duty cycle in accordance with the load magnitude will be described.

Figure 3:
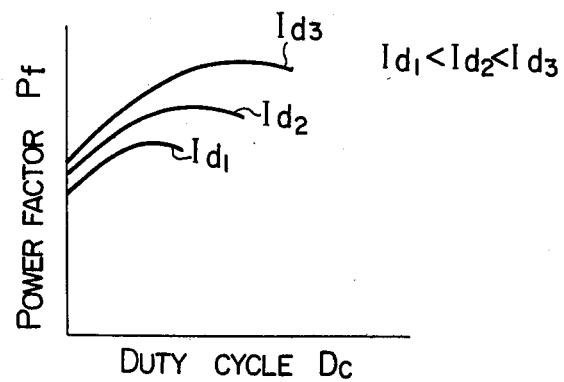
FIG. 3 is a diagram showing the relation between the duty cycle Dc and the power factor Pf with a fixed AC current limit in the power factor improving circuit of FIG. 1.

FIG. 3 shows the relation between the duty cycle Dc and the power factor Pf with a fixed AC current limit $I_{SL}$ for determining the chopper operation time $T_A$. In this drawing, it is seen that the duty cycle Dc associated with the maximum power factor Pf changes with the DC current Id.

Figure 4:
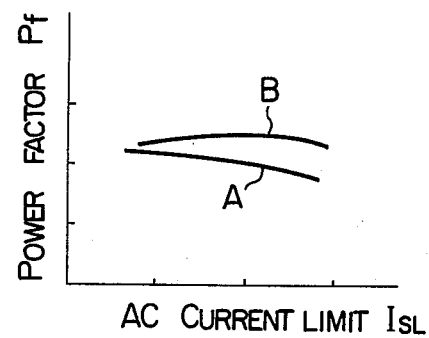
FIG. 4 is a diagram showing the relation between the power factor Pf and the AC current limit $I_{SL}$ with respect to the DC current Id.

The relation between the AC current limit $I_{SL}$ and the power factor is shown in FIG. 4, in which the curve A represents the case in which DC current $Id = Id_1$, and the curve B the case in which $Id = Id_2$, $Id_1$ being smaller than $Id_2$.

As shown in FIG. 4, there is a value of the AC current limit $I_{SL}$ for maximizing the power factor Pf in accordance with the change in the DC current Id.

Figure 5:
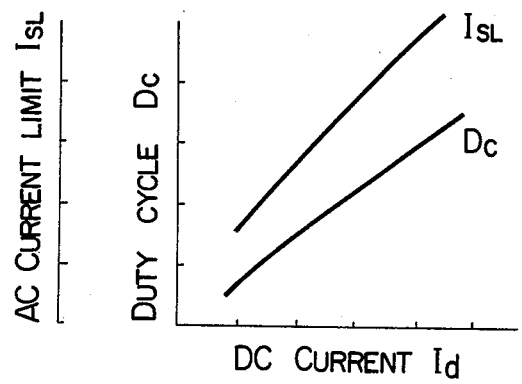
FIG. 5 is a diagram showing the relation between the duty cycle Dc and the AC current limit $I_{SL}$ with respect to the DC current Id.

FIG. 5 shows the relation between the duty cycle Dc and the AC current limit $I_{SL}$ maximizing the power factor Pf for various DC currents Id shown in FIGS. 3 and 4. The DC current Id has a substantially linear relation with the AC current limit $I_{SL}$ and the duty cycle Dc as expressed by an approximate equation below.

$$\text{Ac current limit } I_{SL} = K_1 Id + K_2 \tag{1}$$

$$\text{Duty cycle } Dc = K_3 Id \tag{2}$$

where $K_1$, $K_2$ and $K_3$ are constants which experiments show take values of 2, 5 and 5 respectively when the switching period Tc is 500 μsec and the reactor 7 is 2 mH.

If the AC current limit $I_{SL}$ and the duty cycle Dc are controlled in accordance with the DC current Id as shown in equations (1) and (2), the maximum power factor Dc is obtained for each value of the DC current Id.

Figure 6:
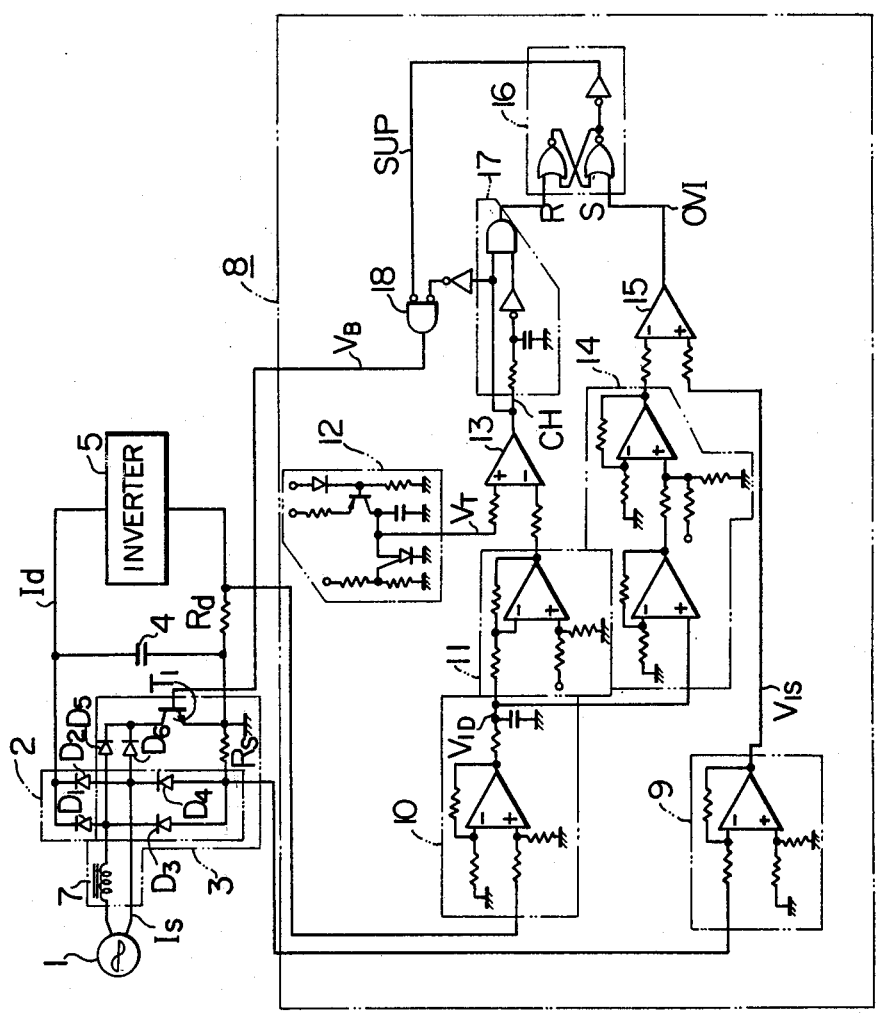
FIG. 6 is a specific circuit diagram according to an embodiment of the present invention.
Figure 7:
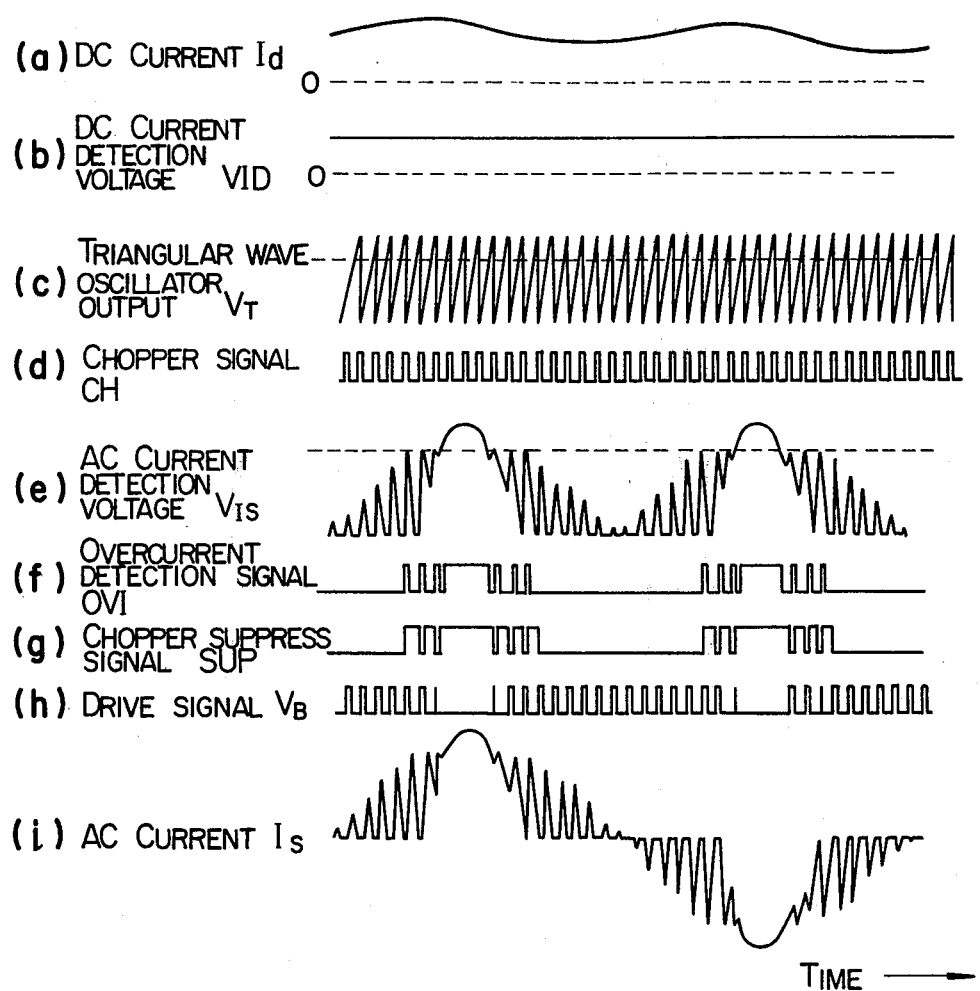
FIG. 7 is a time chart showing the relation of signals produced at various parts of the circuit shown in FIG. 6.

FIG. 6 shows a specific circuit for realizing the control circuit 8 for the power factor improving circuit 3 according to an embodiment of the present invention. In this drawing, those component elements having reference numerals similar to those of FIG. 1 are similar to the corresponding component elements in FIG. 1. FIG. 7 is a time chart representing the signals produced at various parts in FIG. 6.

In FIG. 6, the AC current Is is detected by the resistor Rs inserted between the anode terminals of the diodes $D_3$, $D_4$ and the emitter of the transistor $T_1$.

The current flowing in the resistor Rs is the result of full-wave rectification of the AC current Is (FIG. 7(i)), and the AC current detection voltage $V_{IS}$ (FIG. 7(e)) is obtained by amplifying the voltage across the resistor Rs through the amplifier 9.

The DC current Id (FIG. 7(a)), on the other hand, is detected by the resistor Rd of low value inserted between the smoothing capacitor 4 and the negative input terminal of the inverter 5, and amplified while at the same time being averaged out by the amplifier 10, thus producing a DC current detection voltage $V_{ID}$ (FIG. 7(b)).

An operational amplifier 11 is for correcting the DC current detection voltage $V_{ID}$ in a manner to satisfy the equation (2). The output of the operational amplifier 11 and the output $V_T$ of the triangular wave generator 12 for generating a triangular voltage higher in frequency than the AC power supply 1 as shown in FIG. 7(c) are applied to and compared with each other at a first comparator 13. As a result, the comparator 13 produces a chopper signal CH (FIG. 7(d)). The duty cycle Dc of this chopper signal CH satisfies the relation of equation (2) relating to the DC current Id. The DC current detection voltage $V_{ID}$ is also applied to the operational amplifier 14.

The operational amplifier 14 is for correcting the DC current detection voltage $V_{ID}$ in a manner to satisfy the relation of equation (1) relating to the AC current limit $I_{SL}$. The output of the operational amplifier 14 and the AC current detection voltage $V_{IS}$ are applied to and compared with each other at a second comparator 15, thus producing an overcurrent detection signal OVI (FIG. 7(f)).

The reset terminal of a flip-flop 16 with the set-priority terminal thereof supplied with the overcurrent detection signal OVI is impressed with the output signal of the detector circuit 17 for detecting the rise time point of the chopper signal CH.

The output of the flip-flop 16 is applied, in the form of the suppress signal SUP (FIG. 7(g)), to the NOR circuit 18 together with the chopper signal CH, thus forming a drive signal $V_B$ (FIG. 7(h)). In other words, in response to the production of the overcurrent detection signal OVI, the transistor $T_1$ is turned off until the time point of generation of the next chopper signal CH.

During the period when the overcurrent detection signal OVI is continuously produced, however, the transistor $T_1$ is kept off regardless of the chopper signal CH, and therefore the chopper operation time $T_A$ is determined by the overcurrent detection signal OVI.

By controlling the transistor $T_1$ of the power factor improving circuit 3 by the control circuit 8 shown in FIG. 6, an upward change, for instance, of the DC current Id with the magnitude of the output current of the inverter 5, namely, the magnitude of the load automatically increases the duty cycle Dc and the AC current limit $I_{SL}$ in accordance with the equations (1) and (2), so that the chopper operation time $T_A$ is enlarged, thus automatically leading to a new operating mode where the power factor Pf is maximum at the new value of the current Id, namely, under a new load condition.

Also, in view of the fact that the chopper operation time $T_A$ is so determined that the chopper operation of the transistor $T_1$ is stopped when the AC current Is exceeds the AC current limit $I_{SL}$, the transistor $T_1$ is prevented from being damaged by the overcurrent and is improved in reliability.

As explained above, the embodiments shown in FIGS. 3 to 7 are such that the chopper operation time $T_A$ is determined by detecting the AC current Is, and the AC current limit $I_{SL}$ is controlled in relation with the DC current Id. As an alternative, the chopper operation time $T_A$ may be determined by detecting the AC voltage and controlled in relation with the DC current Id directly.

Further, in the embodiments described above, the DC current Id is detected as the magnitude of the load and the power factor improving circuit 3 is operated in accordance with the DC current Id. Instead of this method, the load condition may be represented by, say, the output of the inverter 5 that is the load but not by the DC current Id to achieve the objects of the present invention.

Also, for the purpose of simplification of the circuit configuration, the chopper operation time $T_A$ or the duty cycle Dc may be controlled in accordance with the magnitude of the load.

According to the present invention, it is thus possible to reduce the number of the diodes making up the power factor improving circuit by integrating the power factor improving circuit with the rectifier circuit at the output side of the rectifier circuit.

Furthermore, the inverter supplied with the output of the rectifier circuit shares a potential line (the negative output line of the rectifier circuit) with the power factor improving circuit, and therefore the control circuits therefor can be integrated, with the result that the insulating means is eliminated, thus simplifying the general configuration of the system for an improved productivity.

What is more, in view of the fact that at least one of the duty cycle of the switching element and the switching operation time of the switching element which are the most important factors for power factor improvement of the power factor improving system is controlled in accordance with the magnitude of the load, the power factor is maximized for the duty cycle and the switching operation time associated with the new load condition even when the load changes.

As a consequence, it is possible to maximize the power factor improvement over a wide range of load conditions instead of a predetermined load condition to which the maximum power factor improvement is limited in the conventional power factor improving systems.

We claim:
1. A power supply system comprising:
an AC power supply operating at a predetermined frequency;
a rectifier circuit including rectifier elements connected to said AC power supply;
a load coupled to a DC output of said rectifier circuit to be applied with output power of said rectifier circuit;
an inductance element connected between said AC power supply and an AC input terminal of said rectifier circuit;
a switching circuit including rectifier elements connected by a switching element between the AC input terminal of said rectifier circuit and the DC output of said rectifier circuit;
an oscillation circuit for oscillating at a frequency higher than the frequency of said AC power supply;
averaging means coupled to said load for providing a weighted voltage signal in accordance with an average DC current flowing in said load;
a comparator coupled to an output of said oscillation circuit and to an output of said averaging means for comparing the output voltage of said oscillation circuit with said weighted voltage signal; and
a circuit coupled between an output of said comparator and said switching element for determining a duty cycle for ON and OFF operations of said switching element on the basis of an output signal of said comparator.

2. A power supply system according to claim 1, wherein the weighted voltage signal is determined in accordance with a relationship of $KI_d$, where K is a constant and $I_d$ is the average DC load current.

3. A power supply system comprising:
an AC power supply operating at a predetermined frequency;
a rectifier circuit including rectifier elements connected to said AC power supply;
a load coupled to a DC output of said rectifier circuit to be applied with output power of said rectifier circuit;
an inductance element connected between said AC power supply and an AC input terminal of said rectifier circuit;
a switching circuit including rectifier elements connected by a switching element between the AC input terminal of said rectifier circuit and the DC output of said rectifier circuit;
an oscillation circuit for oscillating at a frequency higher than the frequency of said AC power supply;
means coupled between said oscillation means and said switching element to control a duty cycle of ON and OFF operations of said switching element in accordance with an output of said oscillation circuit;
averaging means coupled to said load for providing a weighted voltage signal in accordance with an average DC current flowing in said load;
an AC current detecting circuit for detecting the current flowing into said AC power supply;
a comparator coupled to an output of said AC current detecting circuit and an output of said averaging means for comparing an AC current detected voltage proportional to the current detected by said AC current detecting circuit with said weighted voltage signal; and
a circuit coupled between an output of said comparator and said switching element for stopping the ON-operation of said switching element while the output voltage of said AC current detecting circuit exceeds the weighted voltage signal as determined on the basis of the output signal of said comparator.

4. A power supply system according to claim 3, wherein the weighted voltage signal is determined in accordance with a relationship of $K_1I_d+K_2$, where $K_1$ and $K_2$ are constants and $I_d$ is the average DC load current.

5. A power supply system comprising:
an AC power supply operating at a predetermined frequency;
a rectifier circuit including rectifier elements connected to said AC power supply;
a load coupled to a DC output of said rectifier circuit to be applied with output power of said rectifier circuit;
an inductance element connected between said AC power supply and an AC input terminal of said rectifier circuit;
a switching circuit including rectifier elements connected by a switching element between the AC input terminal of said rectifier circuit and the DC output of said rectifier circuit;
an oscillation circuit for oscillating at a frequency higher than the frequency of said AC power supply;
averaging means coupled to said load for providing first and second weighted voltage signals in accordance with an average DC current flowing in said load;
a first comparator coupled to an output of said oscillation circuit and to an output of said averaging means for comparing the output voltage of said oscillation circuit with said first weighted voltage signal;
an AC current detecting circuit for detecting the current flowing into said AC power supply;
a second comparator coupled to an output of said AC current detecting circuit and an output of said averaging means for comparing an AC current detected voltage proportional to the current detected by said AC current detecting circuit with said second weighted voltage signal; and
a circuit coupled between outputs of said first and second comparators and said switching element for determining a duty cycle for ON and OFF operations of said switching element on the basis of an output signal of said first comparator, and stopping the ON-operation of said switching element for more than one period of the output signal of said first comparator while the output voltage of said AC current detecting circuit exceeds the second weighted voltage signal as determined on the basis of an output signal of said second comparator.

6. A power supply system according to claim 5, wherein the load is an inverter, and at least one of said first and second weighted voltage signals is a voltage proportional to an average DC current flowing into said inverter.

7. A power supply system according to claim 5, wherein said AC current detecting circuit includes a low resistance element connected between said rectifier circuit and said switching circuit.

8. A power supply system according to claim 5, wherein the first and second weighted voltage signals are respectively determined in accordance with the relationships of $KI_d$ and $K_1I_d+K_2$, where K, $K_1$ and $K_2$ are constants and $I_d$ is the average DC load current.

* * * * *